(12) United States Patent
Chen et al.

(10) Patent No.: US 12,487,368 B2
(45) Date of Patent: Dec. 2, 2025

(54) SLEEP CONTROL METHOD, TERMINAL, AND STORAGE MEDIUM

(71) Applicant: BEIJING XIAOMI MOBILE SOFTWARE CO., LTD., Beijing (CN)

(72) Inventors: Yucheng Chen, Beijing (CN); Xue Fu, Beijing (CN); Kongpeng Xing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 478 days.

(21) Appl. No.: 17/975,380

(22) Filed: Oct. 27, 2022

(65) Prior Publication Data
US 2024/0004086 A1 Jan. 4, 2024

(30) Foreign Application Priority Data
Jun. 29, 2022 (CN) .......................... 202210764589.7

(51) Int. Cl.
G01S 19/42 (2010.01)
G01S 19/34 (2010.01)
G01S 19/38 (2010.01)
G06F 1/3209 (2019.01)

(52) U.S. Cl.
CPC .............. G01S 19/42 (2013.01); G01S 19/34 (2013.01); G01S 19/423 (2013.01); G01S 19/38 (2013.01); G06F 1/3209 (2013.01)

(58) Field of Classification Search
CPC ........ G01S 19/42; G01S 19/34; G01S 19/421; G01S 19/423; G01S 19/425; G01S 19/38; H04W 52/0254; H04W 52/028; H04W 4/02; Y02D 30/70
USPC .......................... 342/357.21, 357.25, 357.74
See application file for complete search history.

(56) References Cited

U.S. PATENT DOCUMENTS

| 9,927,528 | B2 * | 3/2018 | Jarmuszewski | G01S 19/34 |
| 10,194,395 | B2 * | 1/2019 | Raghupathy | H04W 52/0254 |
| 10,520,608 | B2 * | 12/2019 | Weng | G01S 19/24 |
| 10,575,255 | B2 * | 2/2020 | Korneluk | G01S 19/34 |
| 2014/0253377 | A1 | 9/2014 | Scalisi et al. | |
| 2017/0311264 | A1 | 10/2017 | Raghupathy et al. | |

(Continued)

FOREIGN PATENT DOCUMENTS

| CN | 106405595 A | 2/2017 |
| CN | 106878945 A | 6/2017 |

OTHER PUBLICATIONS

European Patent Application No. 22204623.7, Search and Opinion dated Aug. 16, 2023, 9 pages.

(Continued)

Primary Examiner — Chuong P Nguyen
(74) Attorney, Agent, or Firm — Cozen O'Connor

(57) ABSTRACT

A sleep control method includes determining a positioning request sent by an application; and determining whether to control a positioning module configured for positioning to enter a sleep state, according to at least a demand positioning frequency of the application. An application may be assigned to a preset application list and associated with a preset positioning frequency to determine the allowed demand positioning frequency of the application. Controlling the positioning module to enter a sleep state may also be performed based on the type of positioning request.

18 Claims, 6 Drawing Sheets

(56) References Cited

U.S. PATENT DOCUMENTS

2023/0296789 A1* 9/2023 Chen .................. H04B 7/18545
　　　　　　　　　　　　　　　　　　　　　455/456.1
2023/0393288 A1* 12/2023 Qin ........................ G01S 19/47

OTHER PUBLICATIONS

Chinese Patent Application No. 202210764589.7, Office Action dated Jan. 16, 2025, with English translation, 19 pages.

* cited by examiner

SLEEP CONTROL METHOD, TERMINAL, AND STORAGE MEDIUM

CROSS-REFERENCE TO RELATED APPLICATION

This Application claims the benefit of priority to Chinese Application No. 202210764589.7, filed on Jun. 29, 2022, the contents of which are incorporated herein by reference in their entirety.

BACKGROUND

Currently, a positioning function has become a standard configuration of an intelligent terminal. After receiving a positioning request from an application, a positioning module configured for positioning in the intelligent terminal will continually perform a positioning operation, contributing to high power consumption of the intelligent terminal.

SUMMARY

The present disclosure relates to the field of communication technology, in particular to a sleep control method, a terminal and a computer-readable storage medium.

A first aspect of the present disclosure provides a sleep control method, applied to a terminal, including: determining a positioning request sent by an application; and determining whether to control a positioning module configured for positioning to enter a sleep state, according to at least a demand positioning frequency of the application.

A second aspect of the present disclosure provides a terminal, including: a processor; a memory, configured to store executable instructions of the processor. The processor is configured to determine a positioning request sent by an application, and determine whether to control a positioning module configured for positioning to enter a sleep state according to at least a demand positioning frequency of the application.

A third aspect of the present disclosure provides a non-temporary computer-readable storage medium, on which a computer instruction is stored. When the instruction is executed by a processor, the processor is enabled to implement a sleep control method, comprising: determining a positioning request sent by an application; and determining whether to control a positioning module configured for positioning to enter a sleep state, according to at least a demand positioning frequency of the application.

BRIEF DESCRIPTION OF THE DRAWINGS

The drawings herein are incorporated into the specification and form a part of this specification, showing embodiments consistent with the present disclosure, and are used together with the specification to explain the principles of the present disclosure.

DETAILED DESCRIPTION

Embodiments will be described in detail herein, examples of which are illustrated in the accompanying drawings. Where the following description refers to the drawings, the same numerals in different drawings refer to the same or similar elements unless otherwise indicated. The implementations described in the embodiments below are not intended to represent all implementations consistent with the present disclosure. Rather, they are examples of means consistent with some aspects of the present disclosure as recited in the appended claims.

Terms used in the present disclosure are for the purpose of describing specific embodiments, and are not intended to limit the present disclosure. The singular forms of "a", "an", "said" and "the" used in the present disclosure and the appended claims are also intended to include the majority forms, unless the context clearly indicates other meanings. It should also be understood that the terms "and/or" as used herein refer to and include any or all possible combinations of one or more associated listed items.

It should be understood that although the terms, such as "first", "second", "third", etc., may be used to describe various information in the present disclosure, such information should not be limited to these terms. These terms are used to distinguish the same type of information from each other. For example, without departing from the scope of the present disclosure, first information can also be called second information, and similarly, second information can also be called first information. Depending on the context, the word "if" as used here can be interpreted as "when", "during" or "in response to".

Next, embodiments of the present disclosure will be described in detail.

Figure 1:
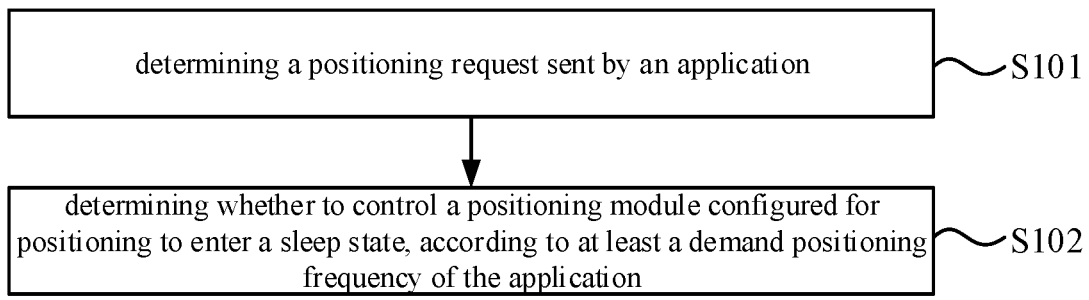
FIG. 1 is a flowchart of a sleep control method according to an embodiment of the present disclosure.

FIG. 1 is a flowchart of a sleep control method according to an embodiment of the present disclosure. As illustrated in FIG. 1, the method may be applied to a terminal, the terminal includes but is not limited to a mobile phone, tablet, wearable device, sensor, Internet of Things device, and other electronic devices. The terminal may be used as a user equipment to communicate with a base station, the base station includes but is not limited to 4G base station, 5G base station and 6G base station.

As illustrated in FIG. 1, the sleep control method includes the following steps:

At block S101, a positioning request sent by an application is determined.

At block S102, whether to control a positioning module configured for positioning to enter a sleep state is determined according to at least a demand positioning frequency of the application.

In related technologies, through configuring a sleep period for the positioning module configured for positioning in the terminal, the terminal can control the positioning module to sleep periodically according to the configured sleep period in a case that it receives the positioning request sent by the application, without continuously executing the positioning operation, which reduces the positioning power consumption.

However, different applications may have different positioning demand frequencies. Since the positioning module that performs positioning is controlled to perform periodic sleep, the positioning will not be performed during the sleep, which will reduce the frequency of positioning. If the positioning module that performs positioning is controlled to perform periodic sleep for all applications, the application with higher demand positioning frequency may not be able to obtain the positioning information of the terminal according to the demand frequency, this may seriously affect the realization of the function of the application.

For example, in order to ensure an accurate provision of navigation service for a user of the terminal, navigation information needs to be provided with relatively high real-time, so the application providing navigation service in the terminal needs to continuously determine the position of the terminal at a relatively high frequency. After receiving the positioning request sent by the application providing navigation service to the user, if the terminal controls the positioning module configured for positioning to sleep periodically, the positioning module will not be able to perform the positioning function when it is in the sleep state, and thus cannot return the current position information of the terminal to the application. This makes the application providing navigation service unable to obtain the position information of the terminal in time, and unable to provide navigation service for the user with fast position changes in the process of navigation, such as prompt the subsequent driving path.

According to the embodiment, in a case that the positioning request sent by the application is received, the terminal may determine whether it is needed to control the positioning module configured for positioning to enter the sleep state according to the demand positioning frequency of the application.

For example, in a case that the terminal receives the positioning request sent by an application with a low demand positioning frequency, it may control the positioning module configured for positioning to enter the sleep state, reducing the power consumption and extending the standby time; in a case that the terminal receives the positioning request sent by an application with a high demand positioning frequency, it may not control the positioning module configured for positioning to enter the sleep state, so as to avoid failing to provide timely the position information of the terminal for the application with a high demand positioning frequency, which affects the realization of the function of the application.

Figure 2:
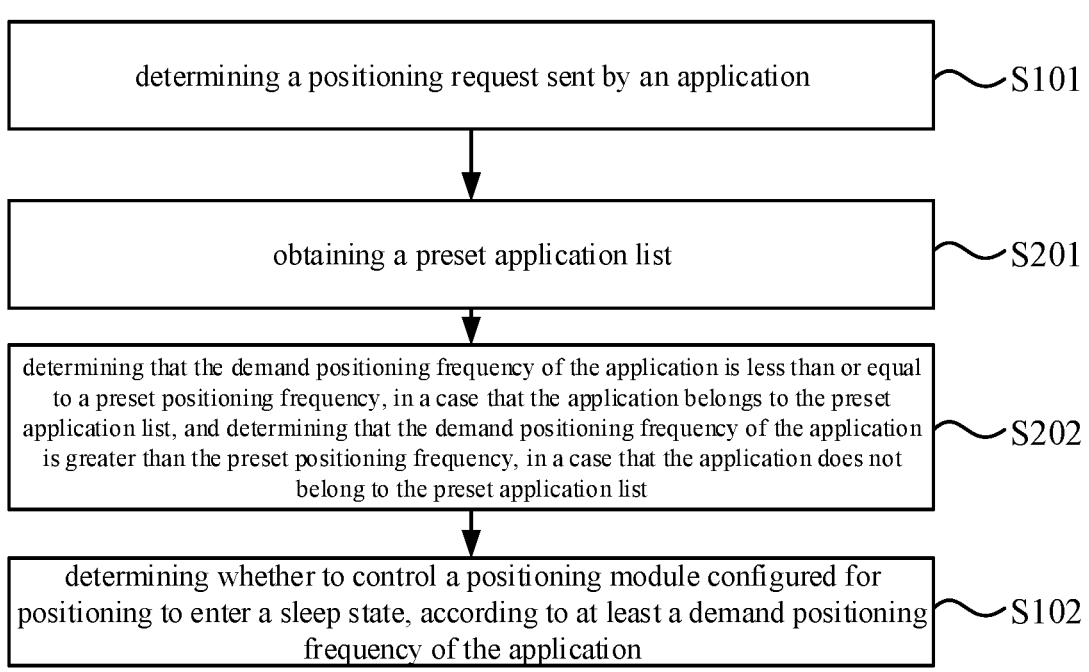
FIG. 2 is a flowchart of a sleep control method according to an embodiment of the present disclosure.

FIG. 2 is a flowchart of a sleep control method according to an embodiment of the present disclosure. As illustrated in FIG. 2, on the basis of the embodiment shown in FIG. 1, the method further includes the following steps:

At block S201, a preset application list is obtained.

At block S202, in a case that the application belongs to the preset application list, the demand positioning frequency of the application is determined to be less than or equal to a preset positioning frequency; in a case that the application does not belong to the preset application list, the demand positioning frequency of the application is determined to be greater than the preset positioning frequency.

In an embodiment, according to the functional demand of the application, an identification of the application with low demand positioning frequency can be included in the preset application list in advance. For example, when a map application initiates a positioning request, it is usually to provide navigation for the user in high-speed moving, and its demand positioning frequency is high, so there is no need to add the map application to the preset application list; a takeout application usually initiates a positioning request to remind a buyer of a delivery route of the rider, its demand positioning frequency is low, so the identification of the takeout application can be added to the preset application list.

In an embodiment, in response to receiving the positioning request, the terminal may obtain the identification of the application sending the positioning request, and match this identification with the identifications to be matched included in the obtained preset application list, for example, to determine whether the identification of the application sending the positioning request belongs to the preset application list. In a case that an identification to be matched in the preset application list is determined to be matched with the identification, it may be determined that the application sending the positioning request is an application with low demand positioning frequency. In a case that no identification to be matched in the preset application list is determined to be matched with the identification, it may be determined that the application sending the positioning request is not an application with low demand positioning frequency.

Figure 3:
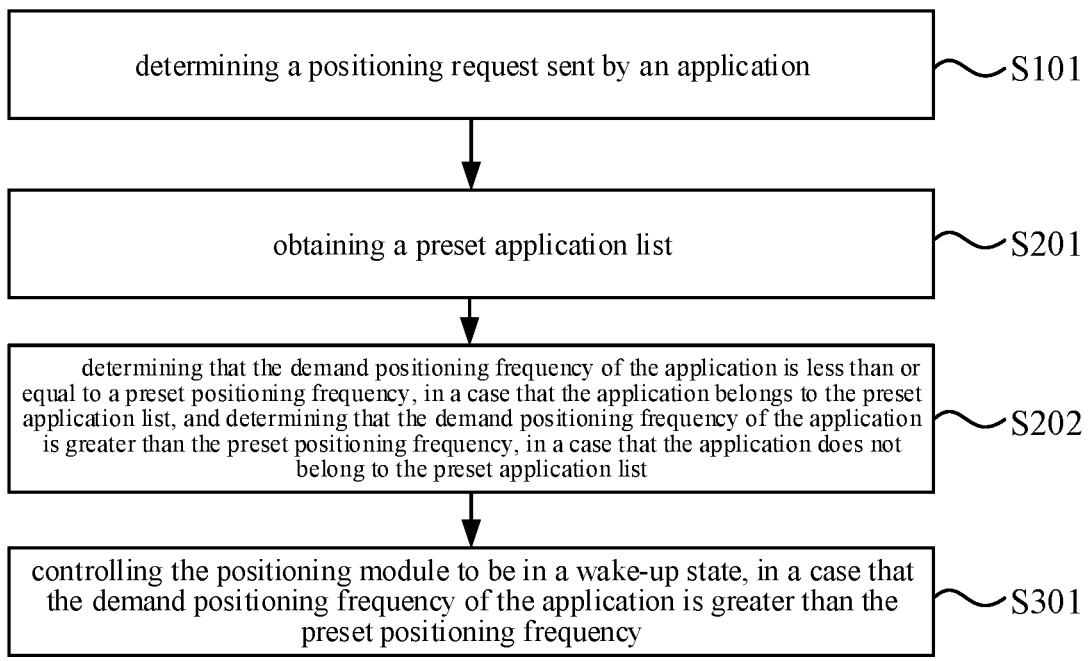
FIG. 3 is a flowchart of a sleep control method according to an embodiment of the present disclosure.

FIG. 3 is a flowchart of a sleep control method according to an embodiment of the present disclosure. As illustrated in FIG. 3, determining whether to control the positioning module configured for positioning to enter the sleep state according to at least the demand positioning frequency of the application, includes the following step:

At block S301, the positioning module is controlled to be in a wake-up state, in a case that the demand positioning frequency of the application is greater than the preset positioning frequency.

In an embodiment, in a case that the demand positioning frequency of the application sending the positioning request is determined to be greater than the preset positioning frequency, the terminal may control the positioning module configured for positioning to be in wake-up state, that is, not control the positioning module to enter the sleep state, according to the demand positioning frequency of the application, so as to avoid that the positioning module cannot provide the position information of the terminal for the application with high demand positioning frequency in time, which affects the realization of the function of the application.

In an embodiment, there are multiple positioning requests, and determining whether to control the positioning module configured for positioning to enter the sleep state according to at least the demand positioning frequency of the application, includes: controlling the positioning module to be in the wake-up state, in a case that the demand positioning frequency of any one of the applications sending the positioning requests is greater than the preset positioning frequency.

In an embodiment, the terminal may receive more than one positioning request from the applications, for example, there may be multiple applications sending positioning requests to the terminal at the same time. In this case, the terminal needs to determine whether to control the positioning module configured for positioning to enter the sleep state according to the demand positioning frequency of each of the applications sending positioning requests.

In a case that the demand positioning frequency of any one of the multiple applications sending the positioning request is greater than the preset positioning frequency, if the positioning module configured for positioning is controlled to enter the sleep state, the positioning module will not be able to provide timely the position information of the terminal to the application with demand positioning frequency greater than the preset positioning frequency. Therefore, in a case that the demand positioning frequency of any one of the applications sending positioning request is greater than the preset positioning frequency, the terminal may control the positioning module to be in the wake-up state to avoid affecting the realization of the function of the application with demand positioning frequency greater than the preset positioning frequency.

Figure 4:
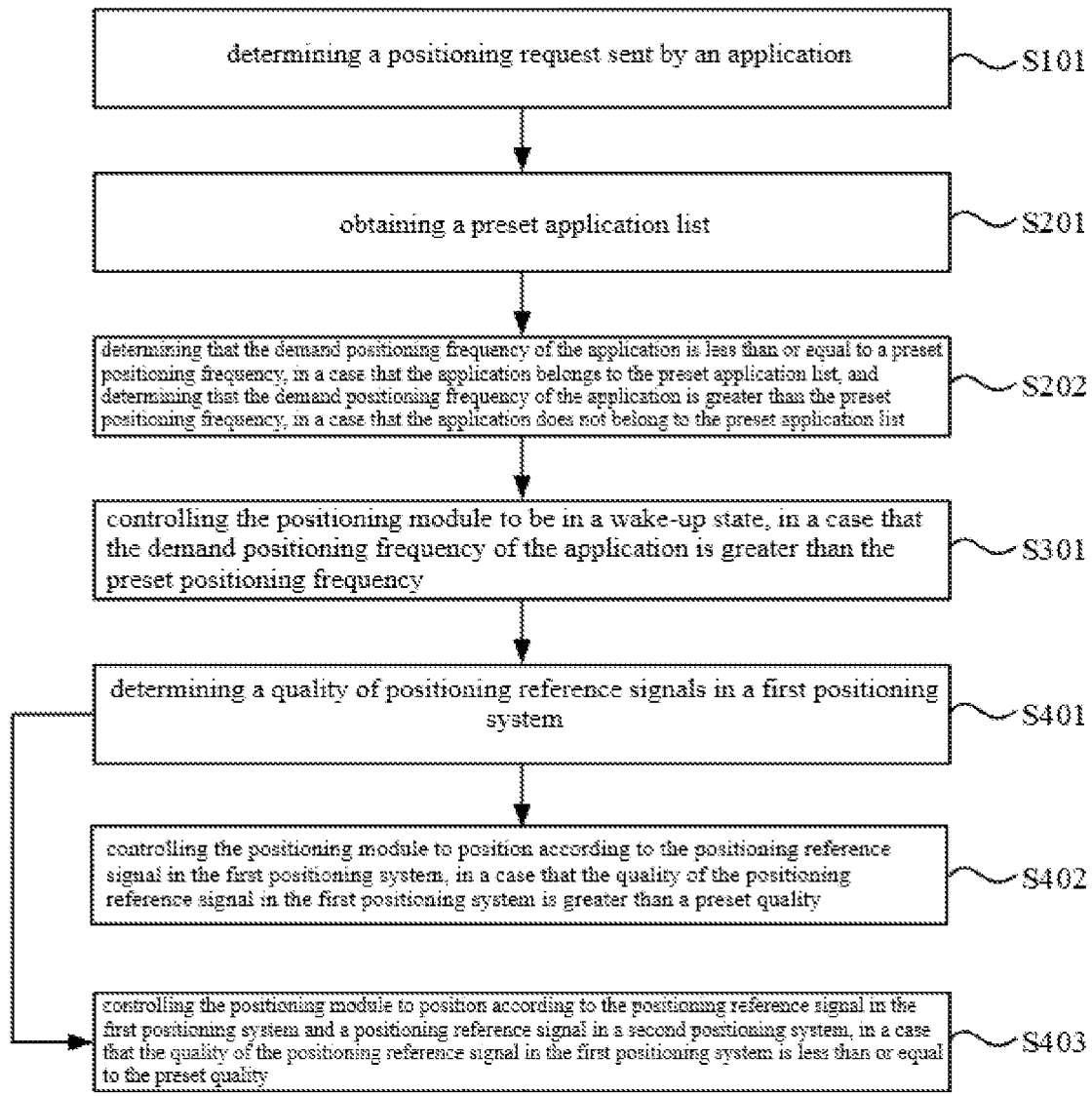
FIG. 4 is a flowchart of a sleep control method according to an embodiment of the present disclosure.

FIG. 4 is a flowchart of a sleep control method according to an embodiment of the present disclosure. As illustrated in FIG. 4, on the basis of the embodiment shown in FIG. 3, in a case that the positioning request is a global navigation satellite system positioning request, the method further includes the following steps:

At block S401, a quality of positioning reference signals in a first positioning system is determined.

At block S402, in a case that the quality of the positioning reference signals in the first positioning system is greater than a preset quality, the positioning module is controlled to position according to the positioning reference signals in the first positioning system.

At block S403, in a case that the quality of the positioning reference signals in the first positioning system is less than or equal to the preset quality, the positioning module is controlled to position according to the positioning reference signals in the first positioning system and positioning reference signals in a second positioning system.

At present, more and more countries or regions have deployed satellite positioning systems. The terminal may receive positioning reference signals from satellites in multiple sets of satellite positioning systems when the global navigation satellite system positioning is performed. Theoretically, positioning can be achieved by obtaining positioning reference signals from at least four satellites. Therefore, in some cases, the positioning reference signals obtained by the terminal are excessive, resulting in a large amount of resource waste.

According to the embodiment, in a case that the positioning request is a global navigation satellite system positioning request and the demand positioning frequency of the application is greater than the preset positioning frequency, it may be determined whether the satellite signals of some positioning systems may be searched according to the quality of the positioning reference signals in the first positioning system, so as to avoid obtaining the positioning reference signals in all positioning systems and causing waste of resources.

In an embodiment, the first positioning system includes at least one of: Global Positioning System (GPS), Beidou Satellite Navigation System (BDS), and Galileo Satellite Navigation System (GALILEO). The second positioning system includes at least one of: Global Navigation Satellite System (GLONASS), Quasi-Zenith Satellite System (QZSS), and Indian Regional Navigation Satellite System (NAVIC).

In an embodiment, the currently deployed satellite positioning systems may be divided into the first positioning systems and the second positioning systems. Compared with the second positioning system, the positioning performance of the first positioning system is relatively better. For example, compared with the second positioning system, the first positioning system deploys a large number of satellites in orbit, covers a wide range of areas, supports a more comprehensive frequency band, and has higher positioning accuracy. Therefore, the position information calculated by the terminal based on the positioning reference signals in the first positioning system is more accurate than that based on the positioning reference signals in the second positioning system.

Therefore, in a case that the quality of the positioning reference signals in the first positioning system is determined to be greater than the preset quality, the positioning may be performed according to the positioning reference signals in the first positioning system, without obtaining the positioning reference signals in the second positioning system, so as to reduce the power consumption of signal search. In a case that the quality of the positioning reference signals in the first positioning system is less than the preset quality, positioning can still be performed according to all positioning systems (the first positioning system and the second positioning system) to avoid large positioning errors due to poor quality of the positioning reference signals in the first positioning system.

In an embodiment, a signal quality includes a signal-to-noise ratio, and determining the quality of the positioning reference signals in the first positioning system includes: determining the signal-to-noise ratios of the positioning reference signals in the first positioning system; determining an average signal-to-noise ratio of a preset number of positioning reference signals with the highest signal-to-noise ratio, according to the signal-to-noise ratio of the positioning reference signals in the first positioning system.

In an embodiment, the terminal can periodically obtain the signal-to-noise ratio of the positioning reference signal of each visible satellite in the first positioning system. In theory, positioning reference signals of four satellites are needed to achieve positioning, so the average signal-to-noise ratio of the four visible satellites with the largest signal-to-noise ratio of the positioning reference signals may be used to represent the signal quality of the first positioning system. The obtained average signal-to-noise ratio is compared with the preset signal-to-noise ratio threshold. If the average signal-to-noise ratio is greater than the preset threshold, it may be determined that the quality of the positioning reference signals in the first positioning system is greater than the preset quality. If the average signal-to-noise ratio is less than or equal to the preset threshold value, it may be determined that the quality of the positioning reference signals in the first positioning system is less than or equal to the preset quality.

In an embodiment, in addition to the above signal-to-noise ratio, the signal quality of the positioning reference signals may also include other parameters such as carrier noise ratio, which can be set by those skilled in the art according to their needs, and the present disclosure does not limit this.

In an embodiment, the method further includes: adding satellites in a second positioning system to a satellite blacklist, in a case that the quality of the positioning reference signals in the first positioning system is greater than a preset quality; and removing the satellites included in the satellite blacklist, in a case that the quality of the positioning reference signals in the first positioning system is less than or equal to the preset quality.

In an embodiment, the terminal may limit the positioning reference signals obtained by the positioning module configured for positioning by establishing the satellite blacklist. In a case that the quality of the positioning reference signals in the first positioning system is determined to be greater than the preset quality, the positioning module configured for positioning may be prohibited from obtaining the positioning reference signals from the satellites in the second positioning system, by adding the satellites in the second positioning system to the satellite blacklist. In a case that the quality of the positioning reference signals in the first positioning system is determined to be less than or equal to the preset quality, the positioning reference signal from all satellites in the positioning system (the first positioning system and the second positioning system) may be obtained by the positioning module configured for positioning, by removing the satellites included in the satellite blacklist.

For example, the first positioning system may include GPS, BDS, and GALILEO. The terminal may calculate, every five minutes, the average signal-to-noise ratio ($GPS_{avg}$) of four GPS satellites with the largest signal-to-noise ratio of the currently obtained positioning reference signals, the average signal-to-noise ratio ($BDS_{avg}$) of four BDS satellites with the largest signal-to-noise ratio of the currently obtained positioning reference signals, and the average signal-to-noise ratio ($GAL_{avg}$) of four GALILEO satellites with the largest signal-to-noise ratio of the currently obtained positioning reference signals.

In a case that $GPS_{avg}$ is greater than the preset signal-to-noise ratio threshold, all GLONASS satellites may be added to the satellite blacklist to prohibit the positioning module from obtaining the positioning reference signals from GLONASS satellites; in a case that $BDS_{avg}$ is greater than the preset signal-to-noise ratio threshold, all QZSS satellites may be added to the satellite blacklist to prohibit the positioning module from obtaining the positioning reference signals from QZSS satellites; in a case that $GAL_{avg}$ is greater than the preset signal-to-noise ratio threshold, all NAVIC satellites may be added to the satellite blacklist to prohibit the positioning module from obtaining the positioning reference signals from NAVIC satellites; in a case that $GPS_{avg}$ is less than or equal to the preset SNR threshold, all satellites included in the satellite blacklist may be removed, to recover and obtain the positioning reference signals in all positioning systems.

Figure 5:
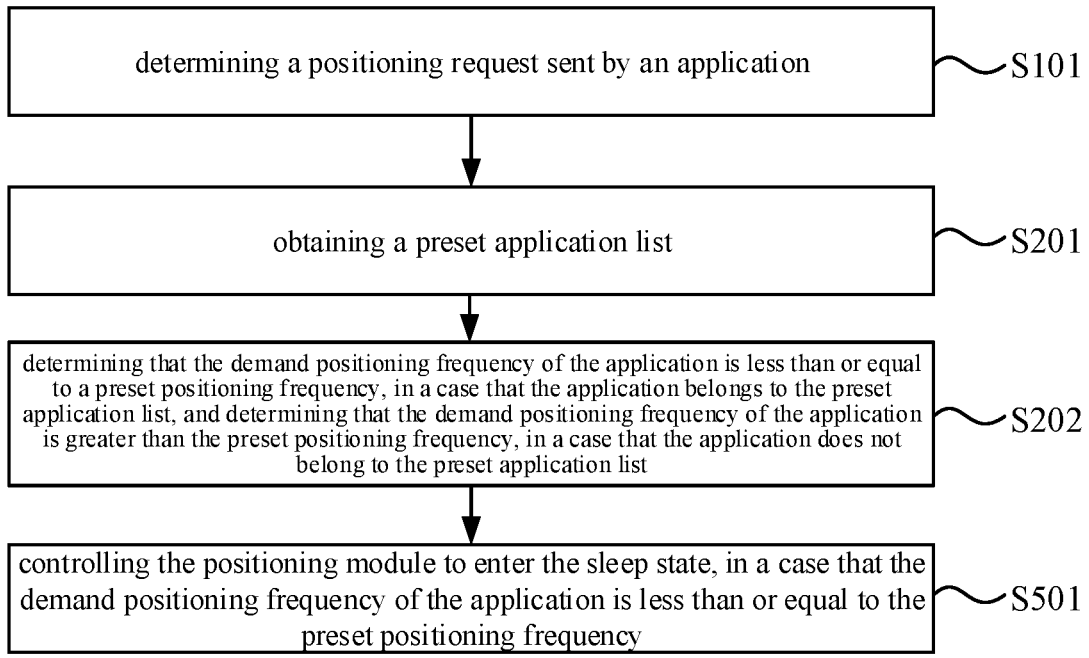
FIG. 5 is a flowchart of a sleep control method according to an embodiment of the present disclosure.

FIG. 5 is a flowchart of a sleep control method according to an embodiment of the present disclosure. As illustrated in FIG. 5, determining whether to control the positioning module configured for positioning to enter the sleep state according to at least the demand positioning frequency of the application, includes the following step:

At block S501, in a case that the demand positioning frequency of the application is less than or equal to the preset positioning frequency, the positioning module is controlled to enter the sleep state.

In an embodiment, in a case that the demand positioning frequency of the application is determined to be low and the position information of the terminal is not needed to obtain in real time, the terminal may control the positioning module configured for positioning to enter the sleep state according to the demand positioning frequency of the application, reducing power consumption and extending the standby time of the terminal.

Figure 6:
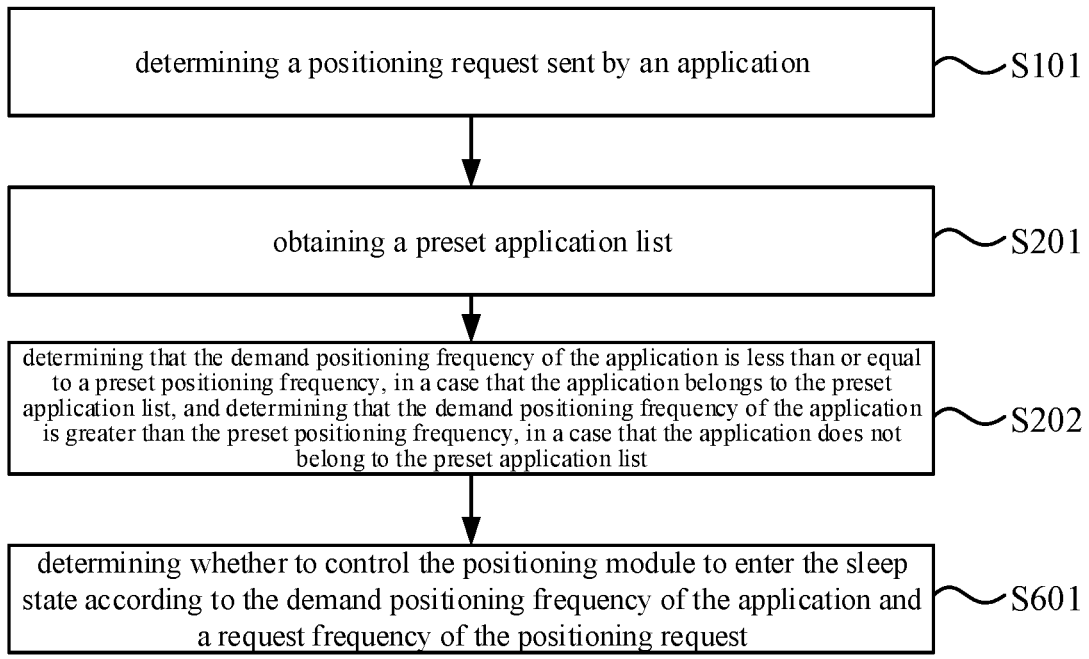
FIG. 6 is a flowchart of a sleep control method according to an embodiment of the present disclosure.

FIG. 6 is a flowchart of a sleep control method according to an embodiment of the present disclosure. As illustrated in FIG. 6, determining whether to control the positioning module configured for positioning to enter the sleep state according to at least the demand positioning frequency of the application, includes: determining whether to control the positioning module to enter the sleep state according to the demand positioning frequency of the application and a request frequency of the positioning request.

The demand positioning frequency of the application is the positioning frequency demanded by the application to achieve its own functions. The request frequency of the positioning request is the positioning frequency by which the application actually requests. For some applications, the positioning frequency requested by the application may not match the positioning frequency demanded by the application.

For example, an application may demand to obtain the positioning information of the terminal every 3 seconds to achieve its desired function, that is, the demand positioning frequency of the application is to position once every 3 seconds. However, in practice, the application may request positioning information of the terminal once per second, that is, the request frequency of the positioning request of the application is once per second. In this case, the demand positioning frequency of the application is not the same as the request frequency of the positioning request send by the application. Therefore, in addition to the demand positioning frequency of the application, the terminal also needs to determine whether to control the positioning module configured for positioning to enter the sleep mode according to the request frequency of the positioning request send by the application.

In an example, determining whether to control the positioning module to enter the sleep state according to the demand positioning frequency of the application and the request frequency of the positioning request, includes: controlling the positioning module to enter the sleep state, in a case that the demand positioning frequency of the application is less than or equal to a preset positioning frequency and the request frequency of the positioning request is greater than or equal to a preset request frequency; and controlling the positioning module to be in a wake-up state, in a case that the demand positioning frequency of the application is greater than the preset positioning frequency or the request frequency of the positioning request is less than the preset request frequency.

In an embodiment, in addition to the demand positioning frequency of the application, the terminal may also determine whether it is needed to control the positioning module configured for positioning to enter the sleep mode according to the actual request frequency of the application. In response to determining that the demand positioning frequency of the application is less than or equal to the preset positioning frequency, the terminal may further determine whether the actual request frequency of the positioning request sent by the application is greater than or equal to the preset request frequency.

When it is determined that the demand positioning frequency of the application is less than or equal to the preset positioning frequency, if the actual request frequency of the positioning request sent by the application is determined to be greater than or equal to the preset request frequency, the terminal may determine that the application has a lower positioning frequency demanded to achieve its own functions and a higher positioning frequency actually requested by it. This situation is usually due to the fact that the demand positioning frequency of the application may not be taken into account by the application developer when he or she sets the request frequency of the positioning request sent by the application, so the positioning frequency actually requested by the application is not needed for the application, and the positioning module does not need to position according to the request frequency of the positioning request.

The terminal may control the positioning module configured for positioning to sleep, to cause the positioning module to position in a lower positioning frequency and return the position information that satisfies the demand positioning frequency, avoiding waste of resources.

For example, when it is determined that the request frequency of the positioning request of an application is to position once per second and the demand positioning frequency of the application is to position once every 3 seconds, the terminal may control the positioning module configured for positioning to sleep periodically. Since the positioning module cannot position in the sleep state, the positioning frequency of the positioning module may be reduced by controlling the positioning module to sleep, so that the positioning module does not need to position once per second according to the received positioning request. By controlling the sleep duration of the positioning module and ensuring that the positioning module performs positioning once every 3 seconds, the positioning power consumption can be reduced while avoiding affecting the realization of the function of the application.

When it is determined that the demand positioning frequency of the application is less than or equal to the preset positioning frequency, if the actual request frequency of the positioning request sent by the application is determined to be less than the preset request frequency, that is, the application with a low demand positioning frequency actually requests a low positioning frequency. In response to receiving the positioning request, the positioning module positions according to the request frequency of the received positioning request, which will not cause the waste of resources, so there is no need to control the positioning module to sleep.

Figure 7:
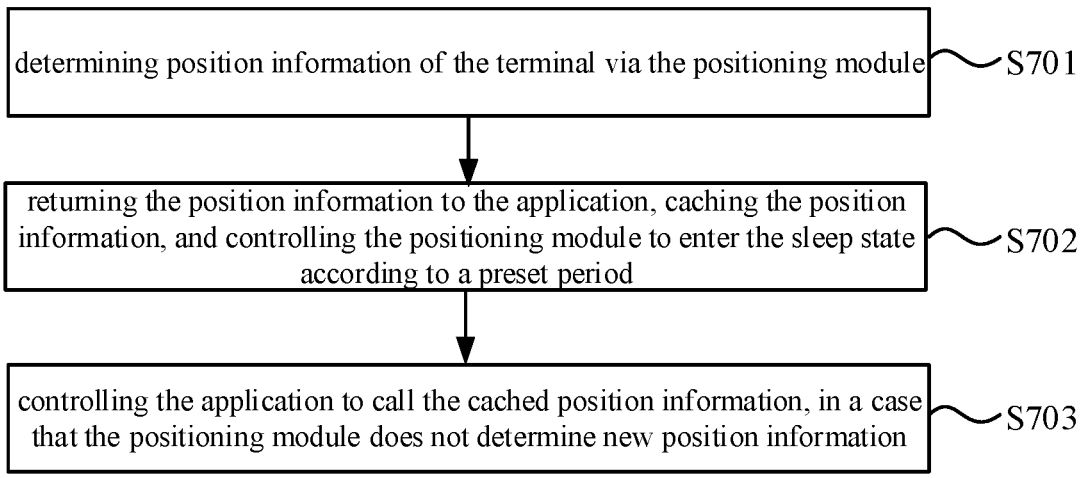
FIG. 7 is a flowchart of a sleep control method according to an embodiment of the present disclosure.

FIG. 7 is a flowchart of a sleep control method according to an embodiment of the present disclosure. As illustrated in FIG. 7, controlling the positioning module to enter the sleep state, includes the following steps:

At block S701, position information of the terminal is determined via the positioning module.

At block S702, the position information is returned to the application, the position information is cached and the positioning module is controlled to sleep according to a preset period.

At block S703, in a case that the positioning module does not determine new position information, the application is controlled to call the cached position information.

In an embodiment, when the terminal is successfully positioned by the positioning module, the current position information of the terminal is obtained and the position information is returned to the application, and the terminal may cache the position information and control the positioning module to sleep periodically.

In an embodiment, the preset period includes a first duration interval and a second duration interval, and controlling the positioning module to sleep according to the preset period includes: controlling the positioning module to be in a sleep state during the first duration interval of the preset period, and controlling the positioning module to be in a wake-up state during the second duration interval of the preset period.

The terminal may control the positioning module to switch periodically between the sleep state and the wake-up state. For any period, it may be divided into the first duration interval and the second duration interval. The terminal may control the positioning module to be in the sleep state during the first duration interval of the period and control the positioning module to switch from the sleep state to the wake-up state at the end of the first duration interval (the start of the second duration interval).

In an embodiment, the first duration interval may be determined by a sleep timer, controlling the positioning module to sleep according to the preset period includes: initiating the sleep timer; controlling the positioning module to enter the sleep state before the sleep timer times out; waking up the positioning module in a case that the sleep timer times out.

When the terminal obtains for the first time the position information through the positioning module configured for positioning and returns the position information to the application, it may cache the position information and initiate the sleep timer to control the positioning module to sleep for a preset time. When the positioning module is in the sleep state, and when the positioning module has just been waken up before calculating the new position information, the terminal may return the cached position information to the application. After the positioning module is waken up, the new position information is recalculated by the positioning module and returned to the application, and the new position information may be cached again and the sleep timer may be re-initiated to control the positioning module to sleep for a preset time again, and so on.

For example, the preset positioning frequency and the preset request frequency are both 1 time every 1 second, and an application needs to perform positioning once every 3 seconds to achieve the function, i.e. the demand positioning frequency of the application is 1 time every 3 seconds, which is greater than the preset positioning frequency, but the actual requested position updating interval set by the developer may be 1 second, i.e. the request frequency of the positioning request sent by the application may be 1 time every 1 second, which is equal to the preset request frequency.

Then, when the terminal obtains the position information for the first time through the positioning module configured for positioning and returns the position information to the application, it may cache the position information and control the positioning module to sleep for 0.5 seconds. During the 0.5 seconds for which the positioning module is in sleep, and after this 0.5 seconds, during the period in which the positioning module has just been woken up before calculating the new position information, the terminal may return the cached position information to the application. After the positioning module recalculates the new position information and returns the new position information to the application, the terminal may cache the new position information again and control the positioning module to sleep for 0.5 seconds again, and so on.

Figure 8:
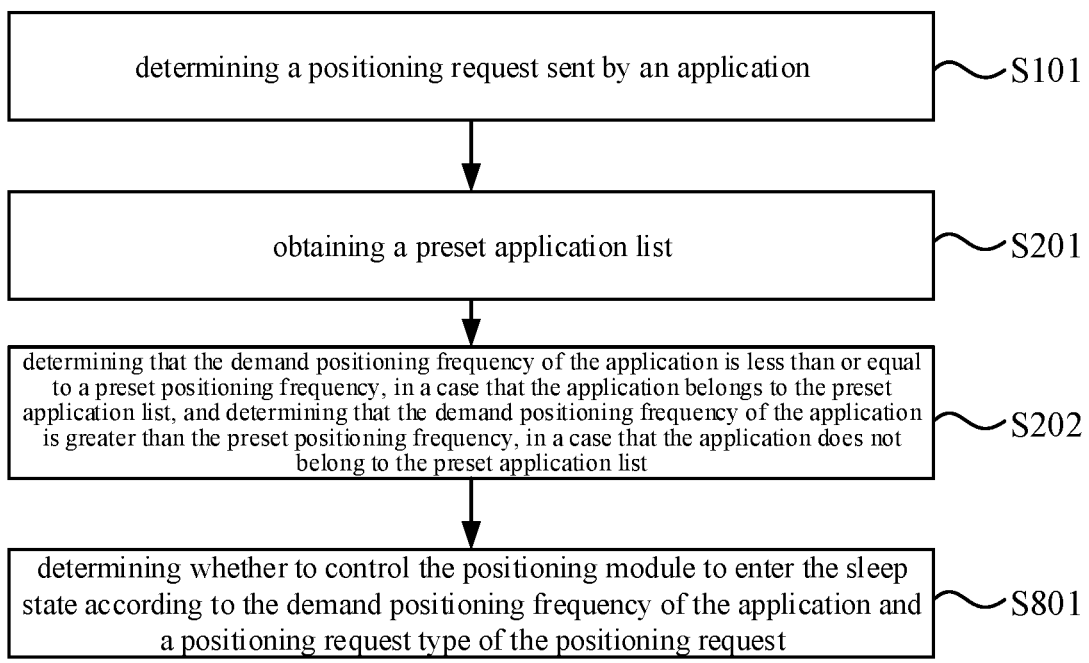
FIG. 8 is a flowchart of a sleep control method according to an embodiment of the present disclosure.

FIG. 8 is a flowchart of a sleep control method according to an embodiment of the present disclosure. As illustrated in FIG. 8, determining whether to control the positioning module configured for positioning to enter the sleep state according to at least the demand positioning frequency of the application, includes the following step:

At block S801, whether to control the positioning module to enter the sleep state is determined according to the demand positioning frequency of the application and a positioning request type of the positioning request.

In an embodiment, determining whether to control the positioning module to enter the sleep state according to the demand positioning frequency of the application and the positioning request type of the positioning request, includes: controlling the positioning module to enter the sleep state, in a case that the positioning request is a global navigation satellite system positioning request, and the demand positioning frequency of the application is less than or equal to a preset positioning frequency; and controlling the positioning module to be in a wake-up state, in a case that the positioning request is a network positioning request, or the demand positioning frequency of the application is greater than the preset positioning frequency.

In an embodiment, the positioning module configured for positioning may be a GNSS (Global Navigation Satellite System) chip positioning module that is configured to achieve GNSS positioning.

In response to receiving the positioning request sent by the application, the terminal may first determine the positioning request type of the positioning request. In a case that the positioning request type of the positioning request is determined to be the GNSS positioning request, it is further determined whether or not to control the positioning module configured for positioning to enter the sleep state at least according to the demand positioning frequency of the application. In a case that the positioning request type of the positioning request is determined to be the network positioning request, there is no need to control the positioning module.

It can be seen from the technical solution provided by the present disclosure that, in a case that the terminal in the present disclosure receives the positioning request sent by the application, it can determine whether it is needed to control the positioning module configured for positioning to enter the sleep state according to the demand positioning frequency of the application.

In a case that the terminal receives the positioning request sent by the application with low demand positioning frequency, the positioning module configured for positioning can be controlled to enter the sleep state, reducing power consumption and extending the standby time. In a case that the terminal receives the positioning request sent by the application with high demand positioning frequency, the positioning module configured for positioning can not be controlled to enter the sleep state, so as to avoid failing to provide timely the position information of the terminal for the application with high demand positioning frequency, which affects the realization of the function of the application.

Corresponding to the above embodiments of the sleep control method, the present disclosure also provides embodiments of a sleep control apparatus.

Figure 9:
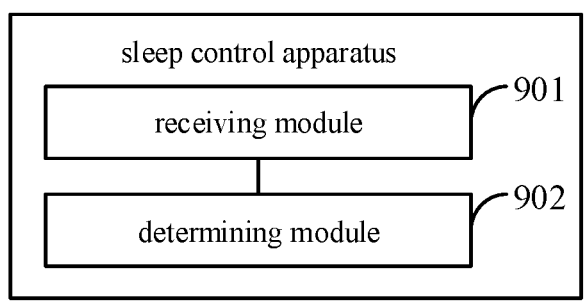
FIG. 9 is a block diagram of a sleep control apparatus according to an embodiment of the present disclosure.

FIG. 9 is a block diagram of a sleep control apparatus according to an embodiment of the present disclosure. As illustrated in FIG. 9, the apparatus may be the terminal or a device composed of modules in the terminal. The terminal includes but is not limited to a mobile phone, tablet, wearable device, sensor, Internet of Things device, and other electronic devices. The terminal may be used as a user equipment to communicate with a base station, the base station includes but is not limited to 4G base station, 5G base station and 6G base station.

As illustrated in FIG. 9, the sleep control apparatus may include a receiving module 901 and a determining module 902.

The receiving module 901 is configured to determine a positioning request sent by an application.

The determining module 902 is configured to determine whether to control a positioning module configured for positioning to enter a sleep state according to at least a demand positioning frequency of the application.

In an embodiment, the apparatus may further include an obtaining module and a positioning frequency determining module.

The obtaining module is configured to obtain a preset application list.

The positioning frequency determining module is configured to determine that the demand positioning frequency of the application is less than or equal to a preset positioning frequency in a case that the application belongs to the preset application list, and determine that the demand positioning frequency of the application is greater than the preset positioning frequency in a case that the application does not belong to the preset application list.

In an embodiment, the determining module is further configured to control the positioning module to be in a wake-up state, in a case that the demand positioning frequency of the application is greater than the preset positioning frequency.

In an embodiment, in a case that the positioning request is a global navigation satellite system positioning request, the apparatus further includes a quality determining module, a first positioning module, and a second positioning module.

The quality determining module is configured to determine a quality of positioning reference signals in a first positioning system.

The first positioning module is configured to control the positioning module to position according to the positioning reference signals in the first positioning system, in a case that the quality of the positioning reference signals in the first positioning system is greater than a preset quality.

The second positioning module is configured to control the positioning module to position according to the positioning reference signals in the first positioning system and positioning reference signals in a second positioning system, in a case that the quality of the positioning reference signals in the first positioning system is less than or equal to the preset quality.

In an embodiment, the apparatus further includes an adding module and a removing module.

The adding module is configured to add satellites in the second positioning system to a satellite blacklist, in a case that the quality of the positioning reference signals in the first positioning system is greater than the preset quality.

The removing module is configured to remove the satellites included in the satellite blacklist, in a case that the quality of the positioning reference signals in the first positioning system is less than or equal to the preset quality.

In an embodiment, the first positioning system includes at least one of: Global Positioning System (GPS), Beidou Satellite Navigation System (BDS), and Galileo Satellite Navigation System (GALILEO). The second positioning system includes at least one of: Global Navigation Satellite System (GLONASS), Quasi-Zenith Satellite System (QZSS), and Indian Regional Navigation Satellite System (NAVIC).

In an embodiment, the determining module is configured to control the positioning module to enter the sleep state, in a case that the demand positioning frequency of the application is less than or equal to the preset positioning frequency.

In an embodiment, the determining module is configured to determine whether to control the positioning module to enter the sleep state according to the demand positioning frequency of the application and a request frequency of the positioning request.

In an embodiment, the determining module is configured to: control the positioning module to enter the sleep state, in a case that the demand positioning frequency of the application is less than or equal to a preset positioning frequency and the request frequency of the positioning request is greater than or equal to a preset request frequency; and control the positioning module to be in a wake-up state, in a case that the demand positioning frequency of the application is greater than the preset positioning frequency or the request frequency of the positioning request is less than the preset request frequency.

In an embodiment, the determining module is configured to: determine position information of the terminal via the positioning module; return the position information to the application, cache the position information, and control the positioning module to enter the sleep state according to a preset period; and control the application to call the cached position information, in a case that the positioning module does not determine new position information.

In an embodiment, the determining module is configured to: initiate a sleep timer; control the positioning module to enter the sleep state before the sleep timer times out; wake up the positioning module in a case that the sleep timer times out.

In an embodiment, the determining module is configured to determine whether to control the positioning module to enter the sleep state according to the demand positioning frequency of the application and a positioning request type of the positioning request.

In an embodiment, the determining module is further configured to: control the positioning module to enter the sleep state, in a case that the positioning request is a global navigation satellite system positioning request, and the demand positioning frequency of the application is less than or equal to a preset positioning frequency; and control the positioning module to be in a wake-up state, in a case that the positioning request is a network positioning request or the demand positioning frequency of the application is greater than the preset positioning frequency.

In an embodiment, there are multiple positioning requests, and the determining module is configured to control the positioning module to be in the wake-up state, in a case that the demand positioning frequency of any one of the applications sending the positioning requests is greater than the preset positioning frequency.

The implementation of the functions of each unit in the above apparatus is detailed in the realization process of the corresponding steps in the above method, and will not be repeated here.

For device embodiments, since they basically correspond to method embodiments, please refer to the partial description of the method embodiments for relevant points. The device embodiments described above are schematic, the units described as separate units can be or can not be physically separated, and the units displayed as units can be or can not be physical units, that is, they can be located in one place, or they can be distributed to multiple network units. Some or all of the modules can be selected according to actual needs to achieve the purpose of the disclosed solution. Ordinary technicians in the art can understand and implement without paying creative labor.

Embodiments of the present disclosure also provide a terminal, which includes a processor and a memory configured to store executable instructions of the processor. The processor executes the executable instructions to implement the sleep control method described in any of the above embodiments.

Embodiments of the present disclosure also provide a computer-readable storage medium, on which a computer instruction is stored. When the instruction is executed by a processor, the steps in the sleep control method described in any of the embodiments above are implemented.

Figure 10:
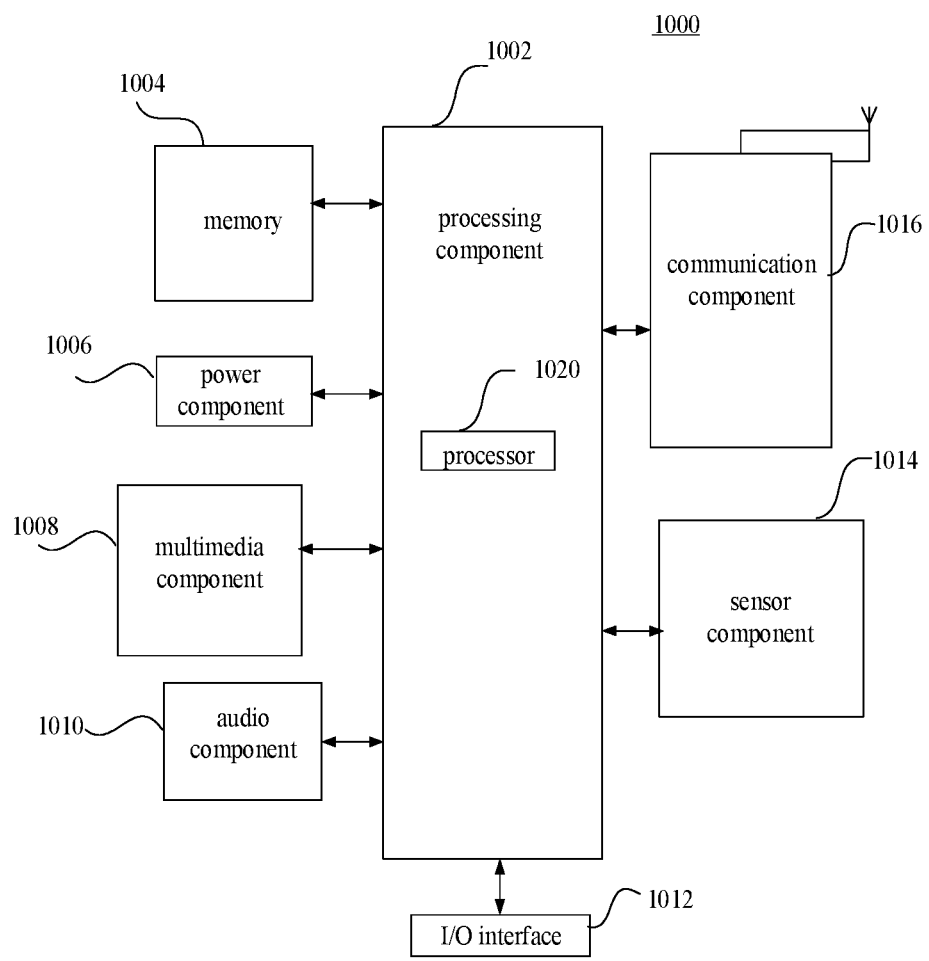
FIG. 10 is a block diagram of a terminal according to an embodiment of the present disclosure.

FIG. 10 is a block diagram of a terminal 1000 according to an embodiment of the present disclosure. For example, the terminal 1000 may be a mobile phone, a computer, a digital broadcasting terminal, a messaging device, a game console, a tablet device, a medical device, a fitness device, a personal digital assistant, etc.

Referring to FIG. 10, the terminal 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls the overall operation of the terminal 1000, such as operations associated with display, telephone call, data communication, camera operation, and recording operation. The processing component 1002 may include one or more processors 1020 to execute instructions to complete all or part of the steps of the method described above. In addition, the processing component 1002 may include one or more modules to facilitate interaction between the processing component 1002 and other components. For example, the processing component 1002 may include a multimedia module to facilitate interaction between the multimedia component 1008 and the processing component 1002.

The memory 1004 is configured to store various types of data to support operations at the terminal 1000. Examples of such data include instructions for any application or method operating on the terminal 1000, contact data, phonebook data, messages, pictures, videos, and the like. The memory 1004 may be implemented by any type of volatile or nonvolatile storage device or a combination of above, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 1006 provides power to various components of the terminal 1000. The power component 1006 may include a power management system, one or more power sources, and other components associated with generating, managing, and distributing power to the terminal 1000.

The multimedia component 1008 includes a screen that provides an output interface between the terminal 1000 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, sliding and gestures on the touch panel. The touch sensor may sense the boundary of the touch or slide action and detect the duration and pressure related to the touch or sliding operation. In some embodiments, the multimedia component 1008 includes a front camera and/or a rear camera. When the terminal 1000 is in an operating state, such as a shooting state or a video state, the front camera and/or the rear camera may receive external multimedia data. Each front camera and rear camera may be a fixed optical lens system or have focal length and optical zoom capability.

The audio component 1010 is configured to output and/or input multimedia data signals. For example, the audio component 1010 includes a microphone (MIC) configured to receive external multimedia data signals when the terminal 1000 is in an operating state, such as a call state, a recording state, and a voice recognition state. The received multimedia data signal may be further stored in the memory 1004 or transmitted via the communication component 1016. In some embodiments, the audio component 1010 further includes a speaker configured to output multimedia data signals.

The I/O interface 1012 provides an interface between the processing component 1002 and a peripheral interface module, which may be a keyboard, a click wheel, an operation button, etc. These operation buttons may include, but are not limited to, a home operation button, a volume operation button, a start operation button, and a lock operation button.

The sensor component 1014 includes one or more sensors for providing various aspects of state evaluation for the terminal 1000. For example, the sensor component 1014 can detect the opening/closing state of the terminal 1000, the relative positioning of the components, such as the display and keypad of the terminal 1000. The sensor component 1014 can also detect the position change of the terminal 1000 or one component of the terminal 1000, the presence or absence of the user's contact with the terminal 1000, the orientation or acceleration/deceleration of the terminal 1000, and the temperature change of the terminal 1000. The sensor component 1014 may include a proximity sensor configured to detect the presence of nearby objects in the absence of any physical contact. The sensor component 1014 may also include a light sensor, such as a CMOS or CCD image sensor, for use in imaging applications. In some embodiments, the sensor component 1014 may also include an acceleration sensor, a gyro sensor, a magnetic sensor, a pressure sensor, or a temperature sensor.

The communication component 1016 is configured to facilitate wired or wireless communication between the terminal 1000 and other devices. The terminal 1000 may access a wireless network based on a communication standard, such as Wi-Fi, 2G or 3G, or a combination of above. In one embodiment, the communication component 1016 receives broadcast signals or broadcast related information from an external broadcast management system via a broadcast channel. In one embodiment, the communication component 1016 also includes a near field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

In an embodiment, the terminal 1000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components configured to perform the above method.

In an embodiment, a non-temporary computer-readable storage medium including instructions is also provided, such as a memory 1004 including instructions, which can be executed by the processor 1020 of the terminal 1000 to complete the above method. For example, the non-temporary computer-readable storage medium can be ROM, random access memory (RAM), CD-ROM, tape, floppy disk, optical data storage device, etc.

The above is embodiments of the present disclosure, and is not intended to limit the present disclosure. Any modification, equivalent replacement, improvement, etc., made within the spirit and principles of the present disclosure should be included in the scope of protection of the present disclosure.

What is claimed is:

1. A sleep control method, performed by a terminal, comprising:
   determining a positioning request sent by an application on the terminal; and
   determining whether to control a positioning module configured for positioning to enter a sleep state, according to at least a demand positioning frequency of the application,
   wherein the method further comprises:
   obtaining an application list;
   determining that the demand positioning frequency of the application is less than or equal to a positioning frequency threshold, in a case that the application belongs to the application list; and
   determining that the demand positioning frequency of the application is greater than the positioning frequency threshold, in a case that the application does not belong to the application list.

2. The method according to claim 1, wherein determining whether to control the positioning module configured for positioning to enter the sleep state according to at least the demand positioning frequency of the application, comprises:
   controlling the positioning module to be in a wake-up state, in a case that the demand positioning frequency of the application is greater than the positioning frequency threshold.

3. The method according to claim 2, wherein in case that the positioning request is a global navigation satellite system positioning request, the method further comprises:
   determining a quality of a positioning reference signal in a first positioning system;
   controlling the positioning module to position according to the positioning reference signal in the first positioning system, in a case that the quality of the positioning reference signal in the first positioning system is greater than a quality threshold; and
   controlling the positioning module to position according to the positioning reference signal in the first positioning system and a positioning reference signal in a second positioning system, in a case that the quality of the positioning reference signal in the first positioning system is less than or equal to the preset quality threshold.

4. The method according to claim 3, further comprising:
   adding satellites in the second positioning system to a satellite blacklist, in a case that the quality of the positioning reference signal in the first positioning system is greater than the quality threshold; and
   removing the satellites included in the satellite blacklist, in a case that the quality of the positioning reference signal in the first positioning system is less than or equal to the quality threshold.

5. The method according to claim 4, wherein
   the first positioning system comprises at least one of:
   Global Positioning System, Beidou Satellite Navigation System, and Galileo Satellite Navigation System; and
   the second positioning system comprises at least one of:
   Global Navigation Satellite System, Quasi-Zenith Satellite System, and Indian Regional Navigation Satellite System.

6. The method according to claim 1, wherein determining whether to control the positioning module configured for positioning to enter the sleep state according to at least the demand positioning frequency of the application, comprises:

controlling the positioning module to enter the sleep state, in a case that the demand positioning frequency of the application is less than or equal to the positioning frequency threshold.

7. The method according to claim 6, wherein controlling the positioning module to enter the sleep state, comprises:
determining position information of the terminal via the positioning module;
returning the position information to the application, caching the position information, and controlling the positioning module to periodically enter the sleep state; and
controlling the application to call cached position information, in a case that the positioning module does not determine new position information.

8. The method according to claim 1, wherein determining whether to control the positioning module configured for positioning to enter the sleep state according to at least the demand positioning frequency of the application, comprises:
determining whether to control the positioning module to enter the sleep state according to the demand positioning frequency of the application and a request frequency of the positioning request.

9. The method according to claim 8, wherein determining whether to control the positioning module to enter the sleep state according to the demand positioning frequency of the application and the request frequency of the positioning request, comprises:
controlling the positioning module to enter the sleep state, in a case that the demand positioning frequency of the application is less than or equal to a positioning frequency threshold and the request frequency of the positioning request is greater than or equal to a request frequency threshold; and
controlling the positioning module to be in a wake-up state, in a case that the demand positioning frequency of the application is greater than the positioning frequency threshold or the request frequency of the positioning request is less than the request frequency threshold.

10. The method according to claim 1, wherein determining whether to control the positioning module configured for positioning to enter the sleep state according to at least the demand positioning frequency of the application, comprises:
determining whether to control the positioning module to enter the sleep state according to the demand positioning frequency of the application and a positioning request type of the positioning request.

11. The method according to claim 10, wherein determining whether to control the positioning module to enter the sleep state according to the demand positioning frequency of the application and the positioning request type of the positioning request, comprises:
controlling the positioning module to enter the sleep state, in a case that the positioning request is a global navigation satellite system positioning request, and the demand positioning frequency of the application is less than or equal to a positioning frequency threshold; and
controlling the positioning module to be in a wake-up state, in a case that the positioning request is a network positioning request, or the demand positioning frequency of the application is greater than the positioning frequency threshold.

12. The method according to claim 1, wherein there are multiple positioning requests, and
determining whether to control the positioning module configured for positioning to enter the sleep state according to at least the demand positioning frequency of the application, comprises:
controlling the positioning module to be in a wake-up state, in a case that the demand positioning frequency of any one of the applications sending the positioning requests is greater than the positioning frequency threshold.

13. A terminal, comprising:
a processor;
a memory, configured to store executable instructions of the processor;
wherein the processor is configured to:
determine a positioning request sent by an application on the terminal; and
determine whether to control a positioning module configured for positioning to enter a sleep state according to at least a demand positioning frequency of the application,
wherein the processor is further configured to:
obtain an application list; and
determine that the demand positioning frequency of the application is less than or equal to a positioning frequency threshold in a case that the application belongs to the application list; and
determine that the demand positioning frequency of the application is greater than the positioning frequency threshold in a case that the application does not belong to the application list.

14. The terminal according to claim 13, wherein the processor is further configured to:
control the positioning module to be in a wake-up state, in a case that the demand positioning frequency of the application is greater than the positioning frequency threshold; and
control the positioning module to enter the sleep state, in a case that the demand positioning frequency of the application is less than or equal to the positioning frequency threshold.

15. The terminal according to claim 13, wherein the processor is further configured to:
determine whether to control the positioning module to enter the sleep state according to the demand positioning frequency of the application and a request frequency of the positioning request; and
control the positioning module to enter the sleep state in a case that the demand positioning frequency of the application is less than or equal to a positioning frequency threshold and the request frequency of the positioning request is greater than or equal to a request frequency threshold, and control the positioning module to be in a wake-up state in a case that the demand positioning frequency of the application is greater than the positioning frequency threshold or the request frequency of the positioning request is less than the request frequency threshold.

16. The terminal according to claim 13, wherein the processor is further configured to:
determine whether to control the positioning module to enter the sleep state according to the demand positioning frequency of the application and a positioning request type of the positioning request; and
control the positioning module to enter the sleep state in a case that the positioning request is a global navigation satellite system positioning request and the demand positioning frequency of the application is less than or equal to a positioning frequency threshold, and control the positioning module to be in a wake-up state in a case that the positioning request is a network positioning request or the demand positioning frequency of the application is greater than the positioning frequency threshold.

17. The terminal according to claim 13, wherein there are multiple positioning requests, and the processor is further configured to:
   control the positioning module to be in the wake-up state, in a case that the demand positioning frequency of any one of the applications sending the positioning requests is greater than the positioning frequency threshold.

18. A non-temporary computer-readable storage medium storing instructions that, when executed by a processor of a terminal, cause the processor to perform a sleep control method, comprising:
   determining a positioning request sent by an application on the terminal; and
   determining whether to control a positioning module configured for positioning to enter a sleep state, according to at least a demand positioning frequency of the application,
   wherein the method further comprises:
   obtaining an application list;
   determining that the demand positioning frequency of the application is less than or equal to a positioning frequency threshold, in a case that the application belongs to the application list; and
   determining that the demand positioning frequency of the application is greater than the positioning frequency threshold, in a case that the application does not belong to the application list.

* * * * *